United States Patent [19]

Thompson

[11] Patent Number: 4,761,999
[45] Date of Patent: Aug. 9, 1988

[54] SET PRESSURE VERIFICATION DEVICE AND METHOD

[75] Inventor: Leonard J. Thompson, Wrentham, Mass.

[73] Assignee: Crosby Valve & Gage Company, Wrentham, Mass.

[21] Appl. No.: 20,104

[22] Filed: Feb. 27, 1987

[51] Int. Cl.$^4$ ............................................. G01M 19/00
[52] U.S. Cl. ........................................................ 73/168
[58] Field of Search ...................... 73/4 R, 4 D, 168; 137/487.5; 364/558; 141/46

[56] References Cited

U.S. PATENT DOCUMENTS

| 2,419,293 | 4/1947 | Simonson | 73/4 R |
| 2,952,151 | 9/1960 | Simonson et al. | 73/4 R |
| 4,349,885 | 9/1982 | Thompson | 73/4 R |
| 4,428,223 | 1/1984 | Trevisan | 73/168 |
| 4,557,136 | 12/1985 | Greenhalf | 73/4 R |
| 4,565,209 | 1/1986 | Ruchser et al. | 137/492 |

FOREIGN PATENT DOCUMENTS 2062812 5/1981 United Kingdom ................ 73/4 R

Primary Examiner—Stewart J. Levy
Assistant Examiner—Robert R. Raevis
Attorney, Agent, or Firm—Grimes & Battersby

[57] ABSTRACT

Test apparatus is provided for measuring the set pressure of a valve coupled to a port in a pressure line. The valve includes a closure element movable between a first limit position sealing the port and a second limit position opening the port. Spring loaded element is provided for biasing the closure element towards said first limit position. An expandable diaphragm device is provided which, upon the introduction of air pressure into an airtight chamber defined by a movable piston, the diaphragm and a base element, is adapted to apply a force ramp to the closure element in a direction opposite to the direction of the bias provided by the spring loaded element. There is also provided an element for calculating the set pressure of said valve.

7 Claims, 2 Drawing Sheets

SET PRESSURE VERIFICATION DEVICE AND METHOD

BACKGROUND OF THE INVENTION

The present invention relates generally to a system for measuring the set pressure of a valve and, more particularly, to a lightweight and portable set pressure verification device for use in conjunction with spring loaded safety relief valves. The device has particular application for use in nuclear power plant containment facilities.

Pressure lines are often designed with safety valves located at various positions along their length. Conventional valves, such as, for example, the Type HB valves manufactured by Crosby Valve and Gage Company, Wrentham, Mass., include a closure element which is nominally biased against the port to seal the port. Typically, this bias is provided by a springloaded assembly coupled to the closure element. The safety valve is designed so that when the pressure in the line is below a predetermined threshold (the "set pressure"), the valve port is sealed. When, however, the line pressure exceeds the set pressure and is sufficient to overcome the spring bias, the valve lifts from its seat in the valve port and the medium within the pressure line is able to freely escape. In the prior art, safety valves are designed for specifically desired set pressures for various applications.

A particular problem experienced in the use of such safety valves was the need to ensure that the set pressure of the valve, as installed, did not change with time, or, if it did change, that the change could be measured. Due to the fact that such set pressures do periodically change, most users will periodically test the set points of their safety valves. One approach for measuring a valve's set point was to remove the valve from the pressure line assembly, fit it on a test jig, test the set point, and then either re-install or replace the valve, as required. This approach, of course, necessitates a shutdown of the pressure line during set point testing.

An alternative test procedure fits the valve with an air-operated lifting motor which is coupled to the closure element and a pressure gauge. In operation, a test operator applies air pressure to the air motor by way of an air pressure regulator or a manual control valve. The resultant force from the motor is applied to the closure element to overcome the springloaded bias and thereupon lift the closure element. When the lifting force from the motor together with the force from the pressure within the line is sufficient to overcome the springloaded bias force, the closure element lifts off its seat with an accompanying audible leak "pop". When such a "pop" is detected by the operator, the air pressure applied to the air motor is measured, and a differential force value may be derived from a predetermined relationship between those parameters for the valve. This differential pressure may be added to the pressure within the line to yield the set pressure characteristic for the valve.

Recordation of this audible "pop" is not an acceptable test procedure in many applications, particularly in a relatively noisy environment where the test operator may not be able to detect the "audible pop". Furthermore, in some applications, such as in boiling water reactor plants, there are hazardous radiation environments in which the set point test operator may not safely enter the immediate region of the valve-to-be-tested. In the prior art, there have been attempts to utilize the above described "audible pop" technique with an acoustical transducer so that remote set point testing may be performed for valves in operational systems. However, these attempts have been unsuccessful, principally due to background noise.

More recent attempts have focused on the use of strip chart recorders and computer assisted recording devices to measure set pressure. Heretofore, however, there has been a tradeoff in such valve testing devices between portability and accuracy. The most reliable of the testing devices have been of the type which are either permanently or semi-permanently mounted on the valve. See, for example, commonly-assigned U.S. Pat. No. 4,349,885, which issued on September 14, 1982 in the name of Leonard J. Thompson for Set Pressure Measuring System, which relies on the use of an external controller to record and process a number of different signals to determine set pressure. This system has proven extremely accurate and is commercially successful. Its construction, however, requires that it either be permanently or semi-permanently mounted on a valve.

A more portable type of testing device is described in U.S. Pat. No. 4,428,223 which issued on Jan. 31, 1984 in the name of Ottavio Trevisan for Apparatus for Periodically Testing the Operation of Safety Valves. Such a system, however, lacks the degree of accuracy of the testing system of the earlier Thompson patent.

Against the foregoing background, it is a primary object of the present invention to provide a relatively portable set pressure measurement device.

It is another object of the present invention to provide such a device which is able to be readily mounted and dismounted on a valve to increase the number of valves which can be practically tested in a fixed period of time.

It is still another object of the present invention to provide such a device which imposes a lower appurtenance load on the valve which it is adapted to test.

It is yet still another object of the present invention to provide such a device which is lower in cost and has fewer movable parts than the test devices heretofore used.

It is still yet another object of the present invention to provide such a device the accuracy of which is equal to the permanently or semi-permanently mounted devices heretofore used.

SUMMARY OF THE INVENTION

To the accomplishments of the foregoing objects and advantages, the present invention, in brief summary, comprises test apparatus for measuring the set pressure of a valve coupled to a port in a pressure line. The valve includes a closure element movable between a first limit position sealing the port and a second limit position opening the port. Spring loaded means are provided for biasing the closure element towards said first limit position. An expandable diaphragm device is provided which, upon the introduction of air pressure into an airtight chamber defined by a movable piston, the diaphragm and a base element, is adapted to apply a force ramp to the closure element in a direction opposite to the direction of the bias provided by the spring loaded means.

BRIEF DESCRIPTION OF THE DRAWINGS

The foregoing and still other objects and advantages of the present invention will be more apparent from the following detailed explanation of the preferred embodiments of the invention in connection with the accompanying drawings wherein.

DESCRIPTION OF THE PREFERRED EMBODIMENT

Figure 1:
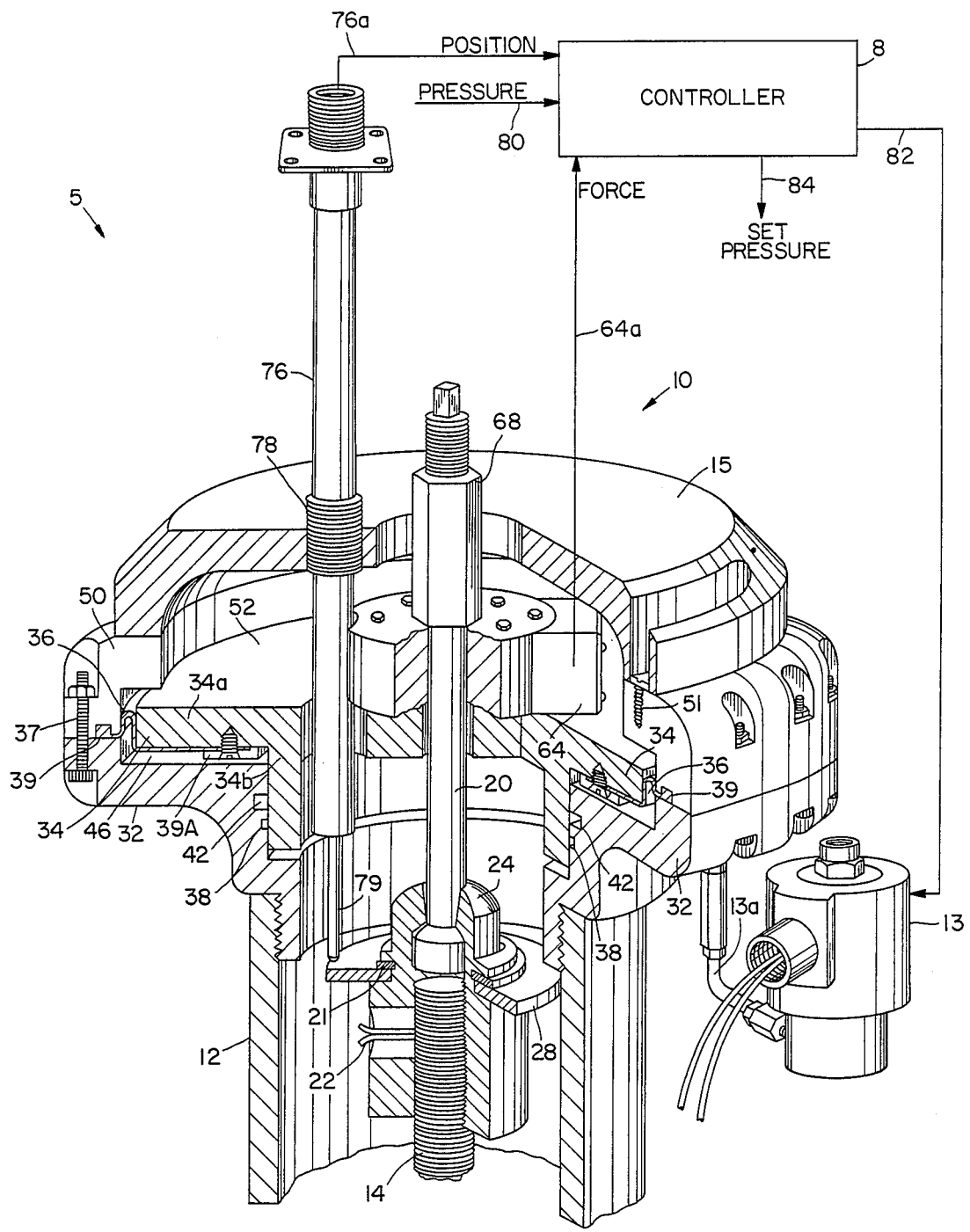
FIG. 1 is a perspective, partially sectional view of the set pressure verification device of the present invention.
Figure 2:
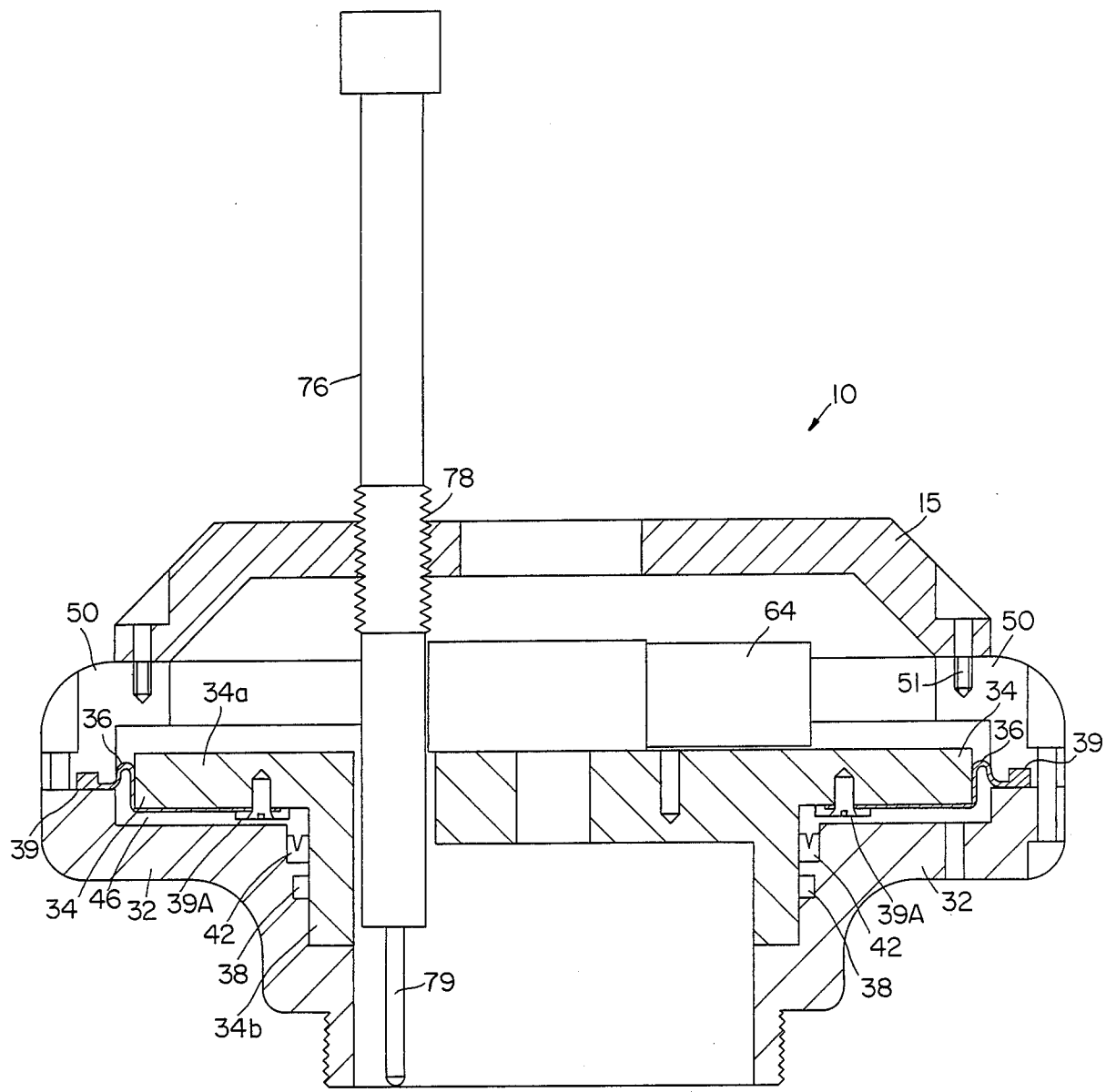
FIG. 2 is a front, cross sectional view of the set pressure verification device of FIG. 1.

FIGS. 1 and 2 illustrate the set pressure verification device of the present invention which is referred to generally by reference numeral 5. It will be appreciated that the present device is an improvement over the set pressure verification device described in applicant's commonly assigned, U.S. Pat. No. 4,349,885, the disclosure of which is hereby incorporated by reference herein.

The device 5 includes a controller 8 and a calibrated, pneumatic assisted head test assembly 10 which is screw-fitted to the top, or bonnet, of a conventional safety valve which may be coupled at a part of a pressure line. The safety valve may, for example, be a type HB valve which is manufactured by Crosby Valve and Gage Company of Wrentham, Mass. Such a valve assembly includes a top or bonnet, having a threaded portion denoted by reference designation 12 in FIG. 1. In addition, the closure element for the valve, which is typically spring biased in a closed position, includes a spindle 14 extending from the closure element. Such a valve configuration is provided for purposes of example only and it will be appreciated that other valve forms may readily be adapted for use with the present embodiment 10.

The test assembly 10 includes a spindle extension 20 which is coupled to the spindle 14 by way of a spindle nut 24 and cotter pin 22. A gage head actuator 28 is affixed to the spindle nut 24 by means of a lock clip 21. The actuator 28 constitutes a substantially horizontal flange (as illustrated).

The test assembly 10 also includes a base member plate 32 which is screw fitted to the threaded portion 12 of the bonnet of the associated valve. The base member plate 32 is attached to an upper guide plate 50 by a plurality of fasteners 37 which are provided about the circumference of the assembly 10. Upper guide plate 50 is likewise secured to an upper LVDT mount 15 by a plurality of fasteners 51.

The positioning of the base member plate 32, the upper or top guide plate 50, and the upper LVDT mount 15 defines an inner chamber 52 in which is provided an annular movable piston 34 having a generally L-shaped configuration with an upper portion 34a and a downwardly extending lower portion 34b. The annular movable piston 34 has a generally complimentary shape to that of the base member plate 32. The path of travel of the annular movable piston 34 within chamber 52 is limited to between the base member plate 32 and top guide plate 50.

The movable piston 34 includes a center aperture through which the spindle extension 20 is adapted to pass. A load cell or force transducer 64 is secured to the upper portion 34a of the movable piston 34. By way of example, the load cell 64 may be a BLH type 44098-2 cell.

An expandable, annular diaphragm 36 is provided on the underside of the upper portion 34a of the movable piston 34. The annular diaphragm 36 is, in a preferred embodiment, fabricated from an elastomeric or polymeric material. Particularly preferred types of such elastomeric material include an ethylene propylene polymers and other fluorocarbon materials such as, for example, the material marketed by E.I. duPont de Nemours under the trademark Viton.

One end of the annular diaphragm 36 is attached to the top guide plate 50 by a lip which is provided on the edge of the diaphragm 36 which is captured in the interface between the top guide plate 50 and the base member plate 32 in a complimentary cavity 39 provided in the top guide plate 50. The diaphragm 36 is secured at its opposite end to the undersurface of the upper portion 34a of the movable piston 34 by an annular retaining plate 39a.

An annular piston seal 42 is provided on the base member plate 32 which is adapted to engage and form a generally airtight seal with the lower portion 34b of the movable piston 32. A wear-strip 38 is further affixed to the base member plate 32 to minimize friction between the base member plate 32 and the movable piston 34.

By providing an annular diaphragm 36 and the piston seal 42, a generally air-tight chamber 46 is provided between the movable piston 34 and the base member plate 32. An input coupling (not shown) is provided through the base member plate 32 for the introduction of air into and out of the airtight chamber 46 through a solenoid pressure line 13a from an external, three way, solenoid valve 13.

The movable piston 34 is illustrated in its lowermost position. As the air pressure increases in the interior of airtight chamber 46, the movable piston 34 is driven upwardly along the wear strip 38. The force transducer 64 is secured to the upper portion 34a of the movable piston 34 so that as the spindle extension 20 moves, the force transducer 64 on the movable piston 34 moves along with it.

The load cell 64 is limited from moving with respect to the spindle extension 20 by a load nut 68. With this configuration, as the airtight chamber 46 expands, the movable piston 34 is displaced upwardly, thereby compressing the load cell 64 between the piston 34 and the load nut 68. The load cell 64 provides an output signal on line 64a representative of stress within the cell. The output signal on line 64a corresponds to the force applied by the diaphragm assembly to the closure element.

The embodiment of FIG. 1 also includes an LVDT position transducer 76, which passes through the LVDT mount 15 through an aperture provided therein. In a preferred embodiment, the LVDT transducer 76 is a Trans-Tek type 354-000 gage head.

The position transducer 76 includes a core member 79, which is adapted to be driven by the actuator 28 as the spindle 14 is raised or lowered (either by the diaphragm assembly or by pressure within the pressure line). The core 79 provides a variable predetermined coupling between the input and output coils of the transformer of the transducer 76, depending on the output signal on line 76a which is representative of the position of the core 79 (which in turn is representative of the position of the valve closure element between a first limit position closing the valve port and a second limit position opening the valve port).

A controller 8 is coupled to line 76a (which provides a closure element position signal), to line 64a (which provides a force signal), and to line 80 (which provides a signal representative of the pressure within the pressure line). Controller 8 also provides a control signal on line 82 to the solenoid valve for controlling air flow to airtight chamber 46 in a conventional manner, and an output signal on line 84 representative of the set pressure for the valve.

In operation, at the initiation of a measurement cycle, the controller 8 controls the air pressure within the airtight chamber 46 to increase so that the diaphragm expands. In response to the diaphragm expansion, the movable piston 34 and the force transducer 64 are raised upwardly thereby compressing the force transducer 64 between the movable piston 34 and the load nut 68. Such motion is transmitted directly by the spindle extension 20 to the closure element (not shown). With the gradual increase of air pressure, the diaphragm 36 provides a force ramp to the closure element. In the preferred form of the invention, the force ramp is linear with the force increasing uniformly with time. Other embodiments may use non-linear form ramps.

In response to the force applied by way of the diaphragm, the closure element is raised from the position where the valve seals the associated port in the pressure line, and the core 79 of the transducer 76 is pushed upward by the flange 28. As a result, the transducer 76 provides an output signal representative of the position of the valve closure element between a first limit position (where the closure element seals the port) and a second limit position (where the port is open).

The controller 8 monitors the signal on line 76a from the position transducer 76 and detects the test time when the core 79 has been displaced by a predetermined distance (corresponding to the lift of the closure element of the valve assembly from the sealing position). At the time that this distance is reached by the core 79, the controller 8 obtains (via line 64a from the load cell) a signal representative of force applied to the force transducer 64. In addition, controller 8 obtains a signal representative of the pressure within the pressure line from line 80.

The controller 8 then utilizes these signals in the manner described in U.S. Pat. No. 4,349,885, the disclosure of which is hereby incorporated herein by reference thereto, to generate a set pressure signal $T_p$, which corresponds to the pressure within the line, $S_p$, plus the ratio $F/A_s$, where $A_s$ is the effective area of the closure element, and F is the force applied to the closure element at the test time.

Having thus described the invention with particular reference to the preferred forms thereof, it will be obvious that various changes and modifications may be made therein without departing from the spirit and scope of the invention as defined by the appended claims.

Wherefore, I claim:

1. An apparatus for measuring the set pressure of a valve coupled to a port in as pressure line, said valve including a valve stem, a closure element connected to said valve stem and movable between a first limit position sealing said port and a second limit position opening said port, and a spring loaded means for biasing said closure element towards said first limit position, said apparatus comprises:

an annular piston adapted to fit about said valve stem;

a base member plate adapted to be removably connected to said valve;

an annular piston seal provided on said base member plate and adapted to engage and form a generally airtight seal with the lower portion of said piston;

a top guide plate having an upper surface and a bottom surface adapted to be mounted to said base member plate;

an upper mount having a bottom surface attached to the upper surface of said top guide plate, wherein said base member plate, said top guide plate and said upper mount define a chamber, and wherein said annular piston is located within said chamber and movable between said base member plate and said top guide plate; and a single annular expandable diaphragm connected to said annular piston and said top guide plate and which, upon the introduction of increased air pressure into said chamber, is adapted to apply a force ramp to said closure element in a direction opposite to the direction of the bias provided by said spring loaded means, whereby said apparatus is adapted to be removably mounted on said valve.

2. The apparatus of claim 1, wherein said annular piston has a generally L-shaped configuration including an upper portion horizontal to said valve stem and a lower portion parallel to said valve stem.

3. The apparatus of claim 2, wherein said annular expandable diaphragm has a center aperture with one circumferential edge connected to the underside of the upper portion of said annular piston and has the other circumferential edge connected to the bottom surface of said top guide plate.

4. The apparatus of claim 1, wherein said diaphragm is elastomeric.

5. The apparatus of claim 1, wherein said diaphragm is made of an ethylene propylene polymer.

6. A set pressure verification device for use in conjunction with a valve coupled to a port in a pressure line, said valve including a valve stem, a closure element connected to said valve stem and movable between a first limit position sealing said port and a second limit position opening said port, and a spring loaded means for biasing said closure element towards said first limit position, said device comprises A. a position transducer for generating a position signal representative of the position of said closure element between said first and second limit positions;

B. an assembly including: an annular piston adapted to fit about said valve stem; a base member plate adapted to be removably connected to said valve; an annular piston seal provided on said base member plate and adapted to engage and form a generally airtight seal with the lower portion of said piston; a top guide plate having an upper surface and a bottom surface adapted to be mounted to said base member plate; an upper mount having a bottom surface attached to the upper surface of said top guide plate, wherein said base member plate, said top guide plate and said upper mount define a chamber, and wherein said annular piston is located within said chamber and movable between said base member plate and said top guide plate; and a single annular expandable elastomeric diaphragm connected to said annular piston and said top guide plate and which, upon the introduction of increased air pressure into said chamber, is adapted to apply a force ramp to said closure element in the direction opposite to the bias provided by said spring loaded means, wherein said assembly is adapted to be removably mounted on said valve; and C. a force transducer for generating a force signal representative of the force applied to said closure element by said diaphragm.

7. A method for calculating the set pressure of a valve coupled to a port in a pressure line, said valve being of the type which includes a valve stem, a closure element connected to said valve stem and movable between a first limit position sealing said port and a second limit position opening said port, and spring loaded means for biasing said closure element towards said first limit position, said method comprises the steps of:

providing a set pressure verification device which includes:

a position transducer for generating a position signal representative of the position of said closure element between said first and second limit positions;

an assembly including: an annular piston adapted to fit about said valve stem; a base member plate adapted to be removably connected to said valve; an annular piston seal provided on said base member plate and adapted to engage and form a generally airtight seal with the lower portion of said piston; a top guide plate having an upper surface and a bottom surface adapted to be mounted to said base member plate; and upper mount having a bottom surface attached to the upper surface of top guide plate, wherein said base member plate, said top guide plate and said upper mount define a chamber, and wherein said annular piston is located within said chamber and movable between said base member plate and said top guide plate; and a single annular expandable elastomeric diaphragm connected to said annular piston and said top guide plate and which, upon the introduction of increased air pressure into said chamber, is adapted to apply a force ramp to said closure element in the direction opposite to the bias provided by said spring loaded means, whereby said assembly is adapted to be removably mounted on said valve; and a force transducer for generating a force signal representative of the forces applied to said closure element by said expandable elastomeric diaphragm;

attaching said set pressure verification device to said valve;

introducing air from an external source into said chamber to thereby apply said force ramp to said closure element in the direction opposite to the bias; and monitoring with external controller means the position signals and the force signals so as to calculate the set pressure of said valve.

* * * * *